Dec. 13, 1966 P. A. MANKIN 3,291,342
FLUID DISPENSING APPARATUS
Filed June 16, 1965 2 Sheets-Sheet 1

INVENTOR.
PAUL A. MANKIN
BY
ATTORNEY

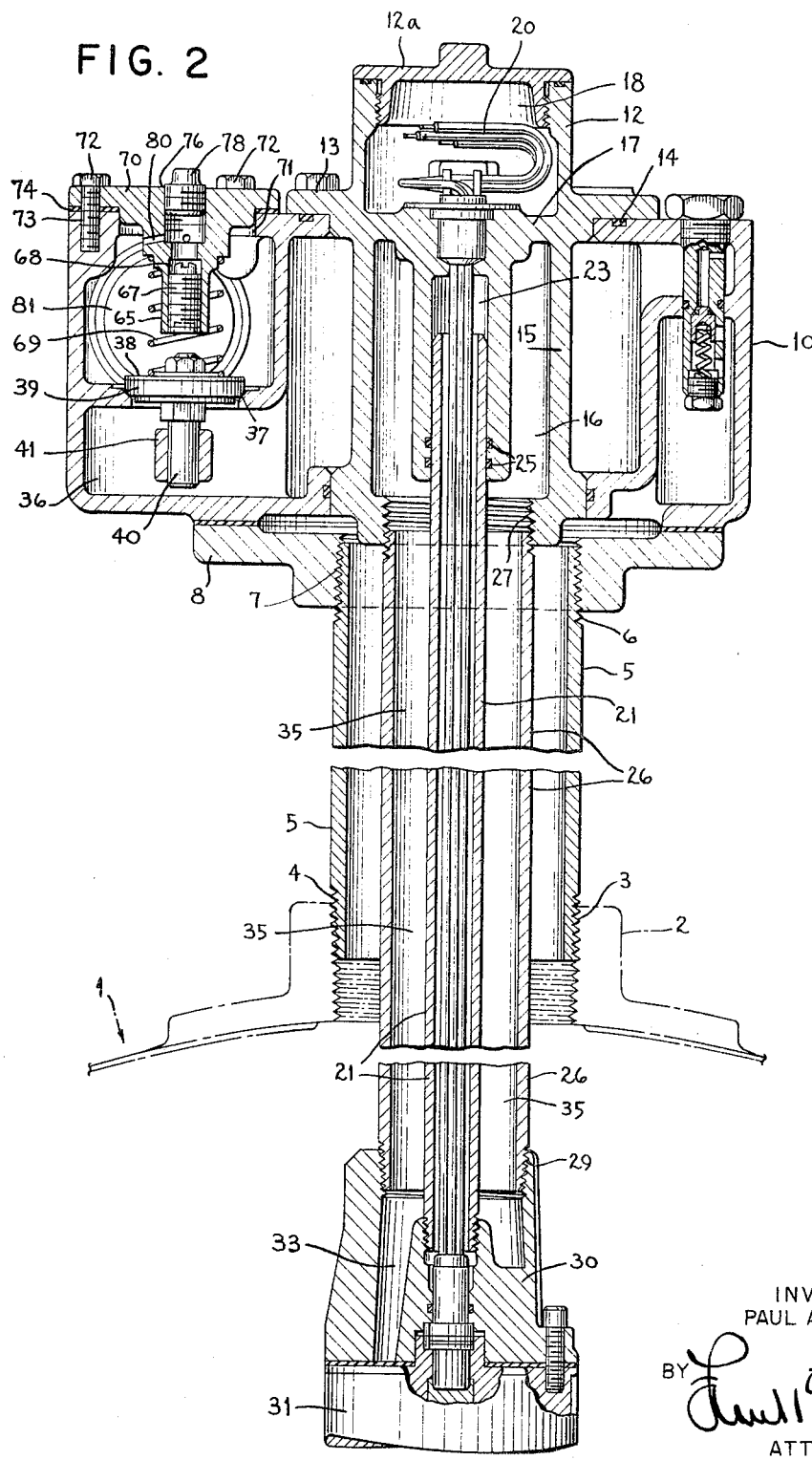

United States Patent Office 3,291,342
Patented Dec. 13, 1966

3,291,342
FLUID DISPENSING APPARATUS
Paul A. Mankin, North Muskegon, Mich., assignor to John Wood Company, East Orange, N.J., a corporation of Delaware
Filed June 16, 1965, Ser. No. 464,327
3 Claims. (Cl. 222—26)

My invention relates to fluid dispensing apparatus, and more particularly to what is known commonly as a submerged pump type of installation connected by suitable piping to liquid dispenser, such as gasoline dispensers for use in well-known types of service stations.

The tank source of supply, normally underground, ordinarily is remotely positioned from the dispensers, and the submerged pump is positioned in the tank source of supply, the inlet end of the submerged pump being spaced a small distance from the bottom of the tank to prevent the pumping of any water or foreign matter which may accumulate in the tank source of supply.

My invention relates particularly to means for maintaining the check and pressure relief valve of the remote submerged pump installation assembly closed on its valve seat, when the piping and connections thereof in the installation are tested for leakage at pressures considerably in excess of the normal opening pressure for the check and relief valve. It is desirable to determine whether there are any leaks at any of the piping and piping connections, so that if any such leak is indicated, it may be corrected prior to covering up and covering over the tank and piping with material such as dirt and concrete, after the complete installation has been made.

My invention includes the various novel features of construction and arrangement hereafter more definitely specified with reference to the accompanying drawings.

Referring to said drawings;

FIG. 2 is a vertical sectional view, partially in elevation, and on a larger scale than FIG. 1, of the remote pumping unit shown positioned into the interior of the underground tank source of liquid supply.

Figure 1:
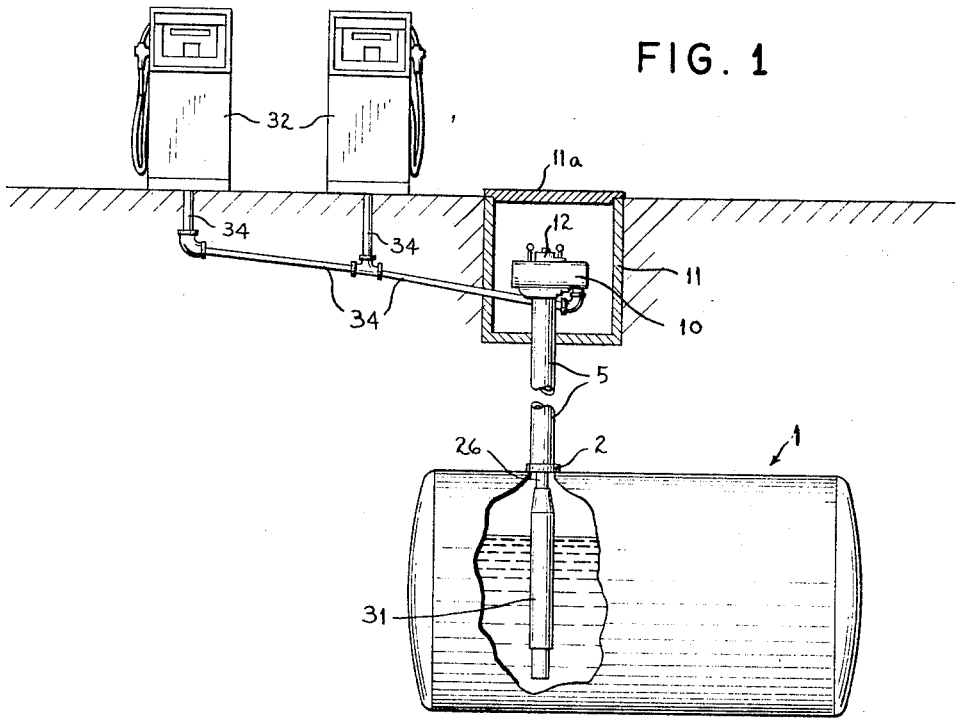
FIG. 1 is a somewhat diagrammatic view showing an underground tank provided with a submerged pumping unit, and the piping connections from the outlet of said pumping unit assembly to individual gasoline dispensers located at ground level or above.

Referring to said drawings, the underground source of supply storage tank, indicated generally at 1, is provided with a flange 2 at the upper part thereof, the flange 2 having a screw-threaded opening 3 therethrough, adapted to be engaged by the screw thread 3 at the lower end 4 of the outer pipe housing 5.

The upper end of the outer pipe 5 is provided with an external screw thread 6 which is adapted to be engaged in fluid tight relationship with the screw-threaded opening 7 formed at the bottom of the closeure 8 for the body member 10. As indicated in FIG. 1, the body member assembly 10 is usually located in a concrete or steel pit 11, provided with a movable cover member 11a at, or near, ground level.

The body member 10 is provided with an upper cap closure member 12 adapted to be maintained in fluid tight relationship by means of a series of screws 13, one of which is indicated in FIG. 2, to maintain said cap member 12 in fluid tight relationship with the body member 10. It is desirable that a gasket member 14 be inserted in a groove formed in the upper wall of the body member 10 to assure that the cap member 12 be in fluid tight relationship with the body member 10.

The cap member 12 includes a downwardly extending portion 15 which is provided with a chamber 16 closed at its uppermost portion by means of a horizontal web 17 formed in said cap member 12.

The cap member 12 includes at its top a junction box chamber portion 18 for the wiring connections indicated at 20 which depend through the cap member 12 and a depending tube 21 which is sealingly engaged at its upper portion in a chamber 23 formed below the junction box chamber 18 in the cap member 12. The cap member 12 is provided with a removable screw-threaded top closure 12ª to permit ready access to the junction box chamber 18. The chamber 23 is provided at its lower portion with spaced apart annular grooves in which sealing means, such as O rings 25, are positioned to maintain the tube 21 in fluid tight relationship with respect to the upper portion of the chamber 23.

Surrounding said tube 21, and conveniently in spaced axial relationship therewith, is the pipe 26 which is screwthreaded at its upper end for engagement in fluid tight relationship with the screw-threaded opening 27 formed in the lower end of the cap member 12.

The lower end of the pipe 26 is screw-threared and is in screw-threaded fluid tight relationship with the screwthreaded opening 29 formed in the upper portion of the member 30, as shown in FIG. 2. The member 30 is connected in fluid tight relationship with a submerged pump assembly of well-known construction, such as indicated generally at 31. The wiring connections indicated at 20 in the junction box portion 18 are connected to a suitable source of electrical energy, and are adapted to be connected to the switch operating means of the dispensers 32 of the well-known type. Suitable piping means 34 connects the fluid outlet of the body member 10 with metering means, dispensing hose and dispensing nozzle of the dispensers 32 in a commonly used wellknown manner.

The wiring 20 is connected at its lower ends to the motor of the submerged pump 31 in a well-known manner.

When the circuit to the motor of the submerged pump has been closed by closure of said switch operating means, fluid under pressure passes around the motor and the submerged pump in a well-known manner and through the opening 33 in the member 30 and thence through the space 35 between the pipe 26 and the smaller diameter pipe 21. The liquid flows from the pipe 26 to the chamber 16 in the cap member 12, and then through suitable porting to the chamber 36 formed in the body 10. The chamber 36 is provided at its upper portion with a valve seat 37 in which is seated a check and relief valve assembly, indicated generally at 38 in FIGS. 2 and 3. The check and relief valve assembly 38 includes a lower valve stem portion 40 which is slidingly engaged in an opening in the guide bracket 41 rigidly formed in the body member 10.

Figure 3:
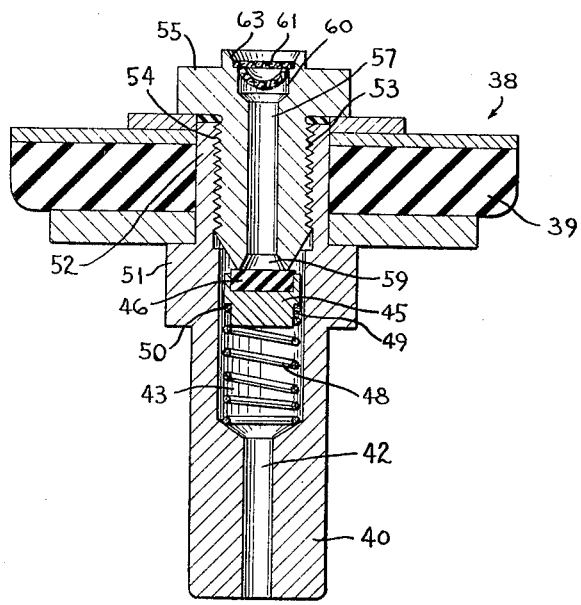
FIG. 3 is a vertical sectional view, on an enlarged scale, of the check and relief valve assembly shown in FIG. 2.

The check and relief valve assembly 38 is provided at its upper portion with a resilient valve member 39, as best shown in FIG. 3, adapted to seat on the valve seat 37. The valve member 39 is securely held between washers on the upper part of the valve portion 40, as shown in FIG. 3.

As best shown in FIG. 3, the valve stem 40 is provided with, conveniently, an axial opening 42, the lower end of which is in open communication with the chamber 36. The valve stem 40 includes a chamber 43 in which is positioned a valve cup member 45 provided with a valve disc 46, formed of resilient material which is resistant to gasoline and similar hydrocarbons. The valve cup member 45 is urged upwardly, as in FIG. 3, by means of the spring 48, the lower end of which is engaged in the bottom of the chamber 43, and the upper end of said spring 48 surrounds the reduced portion 49 of the valve cup member 45, the upper end of said spring 48 being in engagement with the shoulder 50 formed in the cup member 45.

The valve stem 40 of the check and relief valve 38 has an enlarged portion 51 which is provided, at its upper end, with a reduced portion 52, said reduced portion 52 including a screw-threaded opening 53 therethrough, which is adapted to be sealingly engaged with the screw-threaded portion 54 of the valve cap member 55. The enlarged portion 51 and the reduced portion 52 form a shoulder for seating the washers and valve member 39. The valve cap member 55 is provided with an opening 57 therethrough. The lower end of said opening 57 is, conveniently, flared at its lower end 59 to provide a valve seat adapted to be sealingly engaged by the valve disc 46 of the relief valve cup member 45. The upper end of the opening 57 through the cap member 55 is provided with an enlarged portion 60 in which is seated a screen member 61, conveniently formed of Monel wire cloth, say, a wire cloth having 150 x 150–0.0041 mesh openings.

The upper end of the enlarged portion 60 of the opening 57 is conveniently flared outwardly, as at 63, to form a seat for the lower end 65 of the member 67 which is screw-threaded in the screw-threaded opening 68 of the cap cover member 70. The cover member 70 is secured in fluid tight relationship in an opening 71 in the body member 10, conveniently, by means of a series of screws 72 which extend through openings in the cap member 70 into screw-threaded openings 73 formed in the upper portion of the opening in the body member 10. I find it convenient to interpose a sealing gasket 74 between the cap cover member 70 and the top of the body member 10 surrounding the opening 71 formed in said body member 10.

The cap cover 70 is provided with a screw-threaded opening 76 in which is positioned a removable screw plug 78. The cap member 70 is provided with an opening 80, to provide opening communication between the chamber below the plug 78 and the outlet 81 of the body member 10.

*Operation*

When the underground source of supply storage tank 1, with the submerged pump assembly 31 installed, has been put in position, and the outer pipe 5 connected to the body member 10, and the piping means 34 connected to the multiplicity of dispensers 32, it is desirable and expedient that all such units and connections to be positioned underground be tested for leaks prior to the burying of such units underground, and a concrete, macadam, etc. covering be completed at the ground surface. As is well-known, the testing for leaks should be made at pressures considerably in excess of the normal opening pressure for the check and relief valve 38. Accordingly, some means should be provided for maintaining the valve 39 on its seat at pressures considerably in excess of the normal opening pressures for such a valve. Otherwise, the piping, etc. could only be tested at a pressure no greater than the predetermined set pressure for the opening of the check and relief valve 38.

In accordance with my invention, the body member 10 is provided with a cover member 70 which is maintained in fluid tight relationship with the body member 10 by means of the series of screws 72 clamping the cover member 70 in fluid tight relationship with the body member assembly 10, with a gasket means 74 interposed between the bottom surface of the closure member 70 and the opposed surface of the body member 10. The cover member 70 is provided with an opening, the lower portion 68 of which is screw threaded for the screw threaded member 67 provided, conveniently, with a slotted head adapted to be engaged by a screw driver, to effect movement of the member 67. The upper portion 76 of the opening in the closure member 70 is also screw threaded and adapted to receive a screw threaded plug member 78, to prevent water, dirt, etc. from entering the opening in the cover member 70.

When it is desired to test the piping 34, etc., for leaks; the plug member 78 is removed, and a screw driver, conveniently, inserted through the opening to engage the slotted head of the screw member 67. The screw member 67 is then screwed down until it comes into tight engaging contact with the upper portion 63 of the check and valve member 38 to maintain the valve member 39 closed on its seat at test pressures substantially in excess of the pressures at which the valve member 39 normally would be lifted off its seat against the effective forces of its spring 69. The tank 1, pipe 5, body member 10, piping 34, etc., connections are then subjected to fluid pressures substantially in excess of the normal pressure to which such members would be subjected. If fluid at such excess pressures escapes at any point, the cause of the leakage can then be corrected and eliminated conveniently.

If there be no leakage, the screw member 67 is moved in the opposite direction by means of a screw driver to its normal position, as shown in FIG. 2, and the plug 78 replaced in the cover member 70. The ground around the tank, piping, etc., is then filled in, and the above ground surface, if desired, covered with its permanent material such as concrete, macadam, etc.

I do not desire to limit myself to the specific details of the construction as heretofore described, as it is obvious that various modifications may be made therein without departing from the essential features of my invention, as defined in the following claims.

I claim:

1. In a liquid dispensing system which includes a liquid dispenser unit having an outer housing, a meter having a liquid inlet and a liquid outlet, conduit means operatively connected to said meter outlet, a dispensing hose, having a dispensing nozzle at its distal end, connected to said meter outlet, a tank source of supply of liquid remotely positioned from said dispenser unit, a submerged pump positioned in said tank source of supply, an oulet conduit means operatively connected at one end to the outlet of said submerged pump, and operatively connected at its other end to a body member assembly, said body member assembly including a chamber for a check and relief valve assembly adapted to be seated on a seat formed in said body member assembly, and conduit means connecting the outlet of said body member assembly to said inlet of said meter; the invention comprising a spring member normally tending to move said check and relief valve onto its seat, said check and relief valve being normally adapted to be moved off its seat when the fluid pressure of thel iquid from said submerged pump assembly on the underside of said check and relief valve assembly is of a sufficient predetermined value to move said check and relief valve off its seat against the effective forces of said spring member to permit the flow of liquid therethrough; manually operative means adapted to be moved into engaging contact with the upper portion of said check and relief valve assembly to hold said check and relief valve assembly on its valve seat in closed position at liquid pressures considerably in excess of the normal pressure of the fluid on the underside of said check and relief valve assembly; whereby said check and relief valve assembly will remain tightly seated on its valve seat when the fluid pressure within said body member passageways and said conduit means connecting said body member to said submerged pump assembly is increased by a considerable value for the purpose of testing said conduit means and various conduit connections for leaks within the system prior to any burying of said conduit means beneath the ground level.

2. In a liquid dispensing system which includes a liquid dispenser unit having an outer housing, a meter having a liquid inlet and a liquid outlet, conduit means operatively connected to said meter outlet, a dispensing hose, having a dispensing nozzle at its distal end, connected to said meter outlet, a tank source of supply of liquid remotely positioned from said dispenser unit, a submerged pump positioned in said tank source of supply, an outlet conduit means operatively connected at one end to the outlet of said submerged pump, and operatively connected at its other end to a body member assembly, said body member assembly including a check and relief valve assembly adapted to be seated on a seat formed in said body member assembly, and conduit means connecting the outlet of said body member assembly to said inlet of said meter; the invention comprising a spring member normally tending to move said check and relief valve onto its seat, said check and relief valve being normally adapted to be moved off its seat when the fluid pressure of the liquid from said submerged pump assembly on the underside of said check and relief valve assembly is of a sufficient predetermined value to move said check and relief valve off its seat against the effective forces of said spring member to permit the flow of liquid therethrough; manually operative screw means adapted to be screw-threadedly moved into engaging contact with the upper portion of said check and relief valve assembly to hold said check and relief valve assembly on its valve seat in closed position at liquid pressures considerably in excess of the normal pressure of the fluid on the underside of said check and relief valve assembly; whereby said check and relief valve assembly will remain tightly seated on its valve seat when the fluid pressure within said body member passageways and said conduit means connecting to said body member to said submerged pump assembly is increased by a considerable value for the purpose of testing said conduit means and various conduit connections for leaks within the system prior to an burying of said conduit means beneath the ground level.

3. In a liquid dispensing system which includes a liquid dispenser unit having an outer housing, a meter having a liquid inlet and a liquid outlet, conduit means operatively connected to said meter outlet, a dispensing hose, having a dispensing nozzle at its distal end, connected to said meter outlet, a tank source of supply of liquid remotely positioned from said dispenser unit, a submerged pump positioned in said tank source of supply, an outlet conduit means operatively connected at one end to the outlet of said submerged pump, and operatively connected at its other end to a body member assembly, said body member assembly including a chamber for a check and relief valve assembly adapted to be seated on a seat formed in said body member assembly, and conduit means connecting the outlet of said body member assembly to said inlet of said meter; the invention comprising a removable fluid-tight cover member for said chamber; an opening through said cover member, said opening being screw-threaded at its top and bottom portions; a removable screw-threaded plug on said top portion of said opening; a spring member normally tending to move said check and relief valve onto its seat, said check and relief valve being normally adapted to be moved off its seat when the fluid pressure of the liquid from said submerged pump assembly on the underside of said check and relief valve assembly is of a sufficient predetermined value to move said check and relief valve off its seat against the effective forces of said spring member to permit the flow of liquid therethrough; manually operative screw means adapted to be screw-threadedly moved into engaging contact with the upper portion of said check and relief valve assembly to hold said check and relief valve assembly on its valve seat in closed position at liquid pressures considerably in excess of the normal pressure of the fluid on the underside of said check and relief valve assembly; said screw means at its top portion adapted to be engaged by turning means to rotate said screw means into engaging contact with the top of said valve to hold said valve on its seat, said turning means being insertable in said opening in said cover member when said screw-threaded plug is removed from said top portion of said opening; whereby said check and relief valve assembly will remain tightly seated on its valve seat when the fluid pressure within said body member passageways and said conduit means connecting to said body member to said submerged pump assembly is increased by a considerable value for the purpose of testing said conduit means and various conduit connections for leaks within the system prior to any burying of said conduit means beneath the ground level.

References Cited by the Examiner
UNITED STATES PATENTS

| | | | |
|---|---|---|---|
| 1,931,419 | 10/1933 | Thrush | 251—285 X |
| 2,952,389 | 9/1960 | Fowler et al. | 222—52 |
| 2,952,390 | 9/1960 | Fowler et al. | 222—63 |
| 3,010,470 | 11/1961 | Clymer | 222—333 X |
| 3,076,470 | 2/1963 | Langdon | 251—285 X |

ROBERT B. REEVES, *Primary Examiner.*

N. L. STACK, *Assistant Examiner.*